US009077119B2

(12) United States Patent
Wu

(10) Patent No.: US 9,077,119 B2
(45) Date of Patent: Jul. 7, 2015

(54) ANTI-NOISE CABLE TRANSFERRING 1 BILLION-PLUS BITS PER SECOND

(71) Applicant: Chun-Hsing Wu, Taipei (TW)

(72) Inventor: Chun-Hsing Wu, Taipei (TW)

( * ) Notice: Subject to any disclaimer, the term of this patent is extended or adjusted under 35 U.S.C. 154(b) by 99 days.

(21) Appl. No.: 13/973,061

(22) Filed: Aug. 22, 2013

(65) Prior Publication Data

US 2014/0338972 A1 Nov. 20, 2014

(30) Foreign Application Priority Data

May 20, 2013 (TW) ............................ 102209406 U

(51) Int. Cl.
*H02G 15/02* (2006.01)
*H01R 13/6598* (2011.01)
*H01R 9/03* (2006.01)
*H01R 13/6581* (2011.01)

(52) U.S. Cl.
CPC ............ *H01R 13/6598* (2013.01); *H01R 9/034* (2013.01); *H01R 13/6581* (2013.01)

(58) Field of Classification Search
CPC .................................................. H01R 23/7073
USPC .......................... 173/74 R, 78, 350; 439/660
See application file for complete search history.

(56) References Cited

U.S. PATENT DOCUMENTS

| | | | | |
|---|---|---|---|---|
| 8,460,035 | B2 * | 6/2013 | Ueda et al. | 439/660 |
| 2005/0048846 | A1 * | 3/2005 | Suzuki et al. | 439/660 |
| 2011/0053414 | A1 * | 3/2011 | Wan et al. | 439/607.01 |
| 2011/0117787 | A1 * | 5/2011 | Shu et al. | 439/660 |
| 2012/0080224 | A1 * | 4/2012 | Yoo et al. | 174/350 |
| 2013/0164990 | A1 * | 6/2013 | Tsai | 439/660 |

* cited by examiner

*Primary Examiner* — Chau N Nguyen
(74) *Attorney, Agent, or Firm* — Jackson IPG PLLC; Demian K. Jackson

(57) ABSTRACT

The present invention uses connectors to connect different electronic equipments for data transference. With coordination of metal cover layers and metal layers, interferences between cable and electronic equipments are prevented. Thus, interference of electromagnetic leakage from electronic equipments is prevented; signal transmission is stabilized; and, wireless devices are prohibited from electronic radiation of cable for receiving excellent signals.

5 Claims, 4 Drawing Sheets

ANTI-NOISE CABLE TRANSFERRING 1 BILLION-PLUS BITS PER SECOND

TECHNICAL FIELD OF THE INVENTION

The present invention relates to an anti-noise cable; more particularly, relates to using connectors to connect different electronic equipments for data transference with coordination of metal cover layers and metal layers for preventing interferences between cable and electronic equipments, where interference of electromagnetic leakage from electronic equipments is prevented, signal transmission is stabilized and wireless devices are prohibited from electronic radiation of cable for receiving excellent signals.

DESCRIPTION OF THE RELATED ART

A general cable comprises wires and two connecters located at two ends of the wires. Each of the wires comprises a core wire, a bonding braid covered on the core wire and a wire sheath covered on the bonding braid. The connecters are connected with the core wires. Thus, data are transferred between electronic equipments through the cable.

However, the cable uses the bonding braid for ground and noise protection, only. When the connectors connect the electronic equipments for data transmission (especially at a speed of 1 billion-plus bits per second), signals transferred may be easily interfered by the cable and the electronic equipments; and, thus, states of signals become unstable, transmission performance is worsened and wireless devices are affected by electronic radiation of cable.

Hence, the prior art does not fulfill all users' requests on actual use.

SUMMARY OF THE INVENTION

The main purpose of the present invention is to use connectors for connecting different electronic equipments for data transference with coordination of metal cover layers and metal layers for preventing interferences between cable and electronic equipments, where interference of electromagnetic leakage from electronic equipments is prevented, signal transmission is stabilized and wireless devices are prohibited from electronic radiation of cable for receiving excellent signals.

To achieve the above purpose, the present invention is an anti-noise cable transferring 1 billion-plus bits per second, comprising a cable wire, a first connector, a second connector and a metal cover layer, where the cable wire comprises a plurality of signal lines, a plurality of power lines and a plurality of earth lines; the first connector is connected at an end of the cable wire; the first connector comprises a rubber core; a plurality of pins disposed on the rubber core and connected with the signal lines, the power lines and the earth lines; a first metal shell covered on the rubber core; a metal layer layered on an inner surface of the first metal shell; and a plastic shell covered on the metal layer; the second connector is connected at another end of the cable wire; the second connector comprises a rubber core; a plurality of pins disposed on the rubber core and connected with the signal lines, the power lines and the earth lines; a second metal shell covered on the rubber core; a metal layer layered on an inner surface of the second metal shell; and a plastic shell covered on the metal layer; and the metal cover layer is covered on the signal lines of the cable wire at each end of the signal lines and is connected with the first metal shell of the first connector and the second metal shell of the second connector. Accordingly, a novel anti-noise cable transferring 1 billion-plus bits per second is obtained.

BRIEF DESCRIPTIONS OF THE DRAWINGS

The present invention will be better understood from the following detailed description of the preferred embodiment according to the present invention, taken in conjunction with the accompanying drawings in which FIG. 1 is the perspective view showing the preferred embodiment according to the present invention;

DESCRIPTION OF THE PREFERRED EMBODIMENT

The following description of the preferred embodiment is provided to understand the features and the structures of the present invention.

Figure 1:
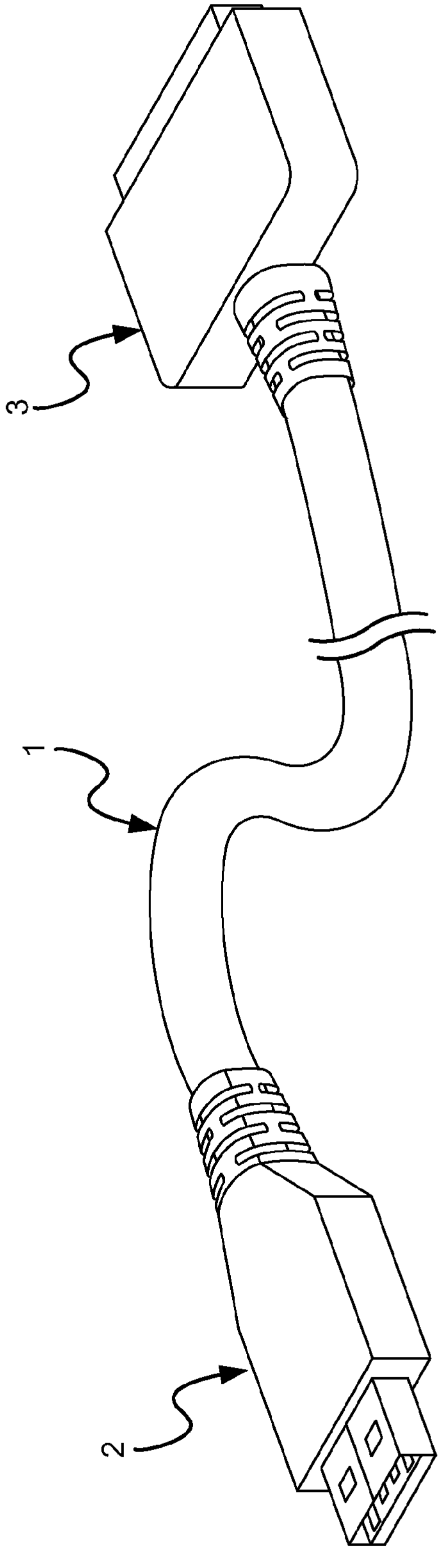
Figure 2:
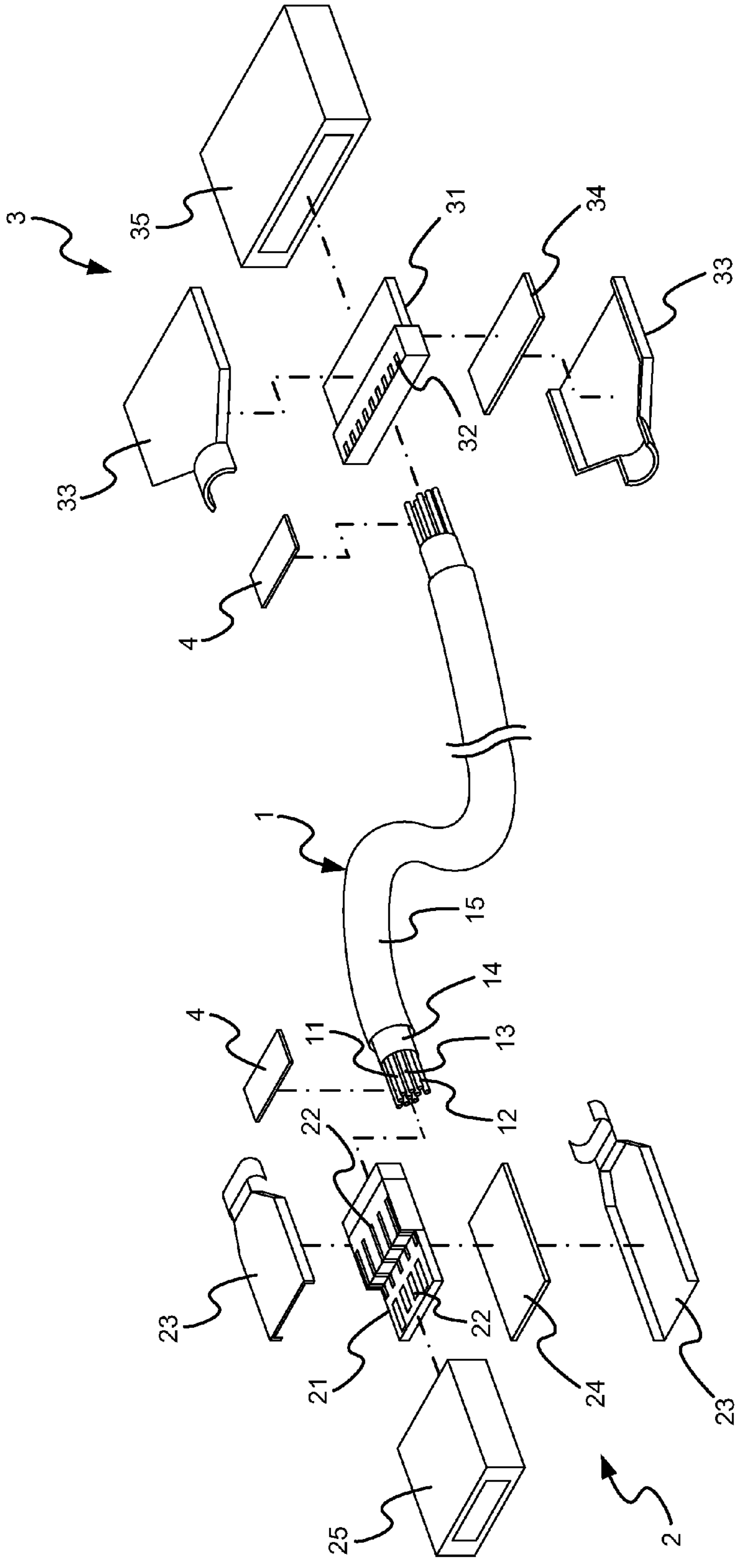
FIG. 2 is the explosive view showing the preferred embodiment.
Figure 3:
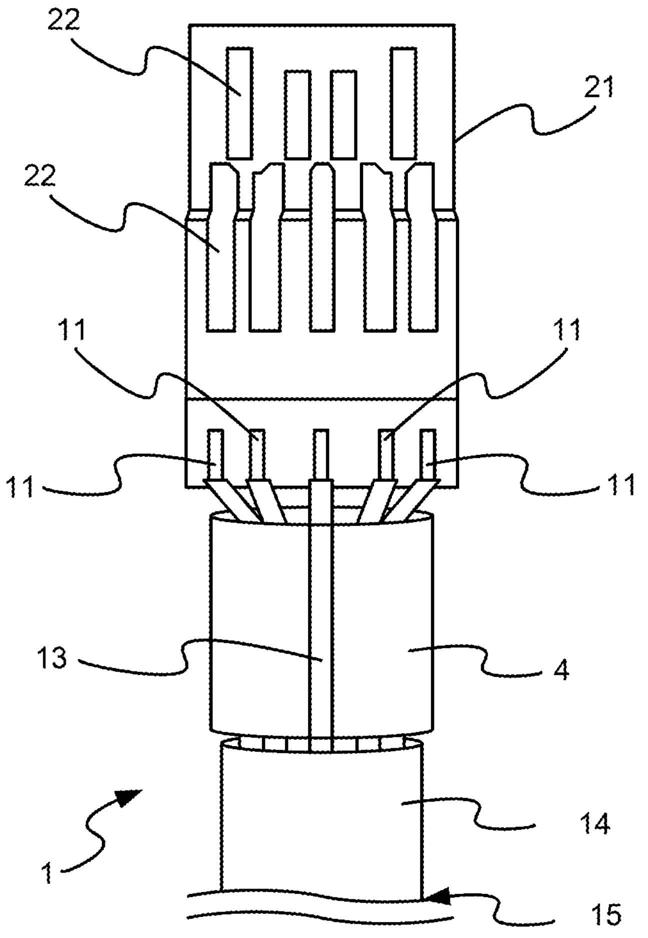
FIG. 3 is the view showing the binding state of the cable wire, the first connector and the metal cover layer.
Figure 4:
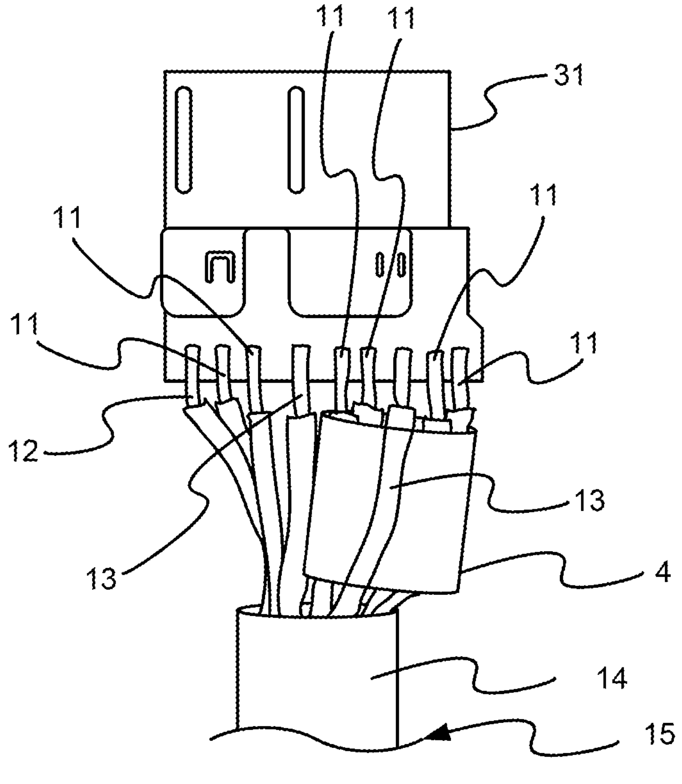
FIG. 4 is the view showing the binding state of the cable wire, the second connector and the metal cover layer.

Please refer to FIG. 1 to FIG. 4, which are perspective and explosive views showing the preferred embodiment according to the present invention; a view showing a binding state of a cable wire, a first connector and a metal cover layer; and a view showing a binding state of a cable wire, a second connector and a metal cover layer. As shown in the figures, the present invention is an anti-noise cable transferring 1 billion-plus bits per second, comprising a cable wire 1, a first connector 2, a second connector 3 and a metal cover layer 4.

The cable wire 1 comprises a plurality of signal lines 11, a plurality of power lines 12 and a plurality of earth lines 13; the signal lines 11, the power lines 12 and the earth lines 13 are covered with a bonding braid 14; and, the bonding braid 14 is covered with a wire sheath 15.

The first connector 2 is connected at an end of the cable wire 1, comprising a rubber core 21; a plurality of pins 22 disposed on the rubber core 21 and connected with the signal lines 11, the power lines 12 and the earth lines 13; a first metal shell 23 covered on the rubber core 21; a metal layer 24 layered on an inner surface of the first metal shell 23; and a plastic shell 25 covered on the first metal shell 23. Therein, the metal layer 24 is made of a conducting metal, like gold, silver, copper or iron, or a composite conducting metal; and, the first connector 2 comprises a plurality of universal serial buses (USB), like USB2.0 or USB3.0, piled up (A-plug).

The second connector 3 is connected at another end of the cable wire 1, comprising a rubber core 31; a plurality of pins 32 disposed on the rubber core 31 and connected with the signal lines 11, the power lines 12 and the earth lines 13; a second metal shell 33 covered on the rubber core 31; a metal layer 34 layered on an inner surface of the second metal shell 33; and a plastic shell 35 covered on the second metal shell 33. Therein, the metal layer 34 is made of a conducting metal, like gold, silver, copper or iron, or a composite conducting metal; and, the second connector 3 comprises a plurality of USBs, like USB2.0 or USB3.0, arranged in parallel (Micro-B).

The metal cover layer 4 is covered on the signal lines 11 of the cable wire 1 at each end of the signal lines 11; the metal cover layer 4 is connected with the first metal shell 23 of the first connector 2 and the second metal shell 33 of the second connector 3; and the metal cover layer 4 is made of a conducting metal, like gold, silver, copper or iron, or a composite conducting metal.

Thus, a novel anti-noise cable transferring 1 billion-plus bits per second is obtained.

On using the present invention, the first and second connectors 2,3 are connected with different electronic equipments for data transmission (not shown in the figures). During data transmission, the metal layers 24,34 and the metal cover layer 4 are set to obtain low impedance for the signal lines 11. When the cable wire 1 transfers data with the first and second connectors 2,3, the metal layers 24,34 and the metal cover layer 4 are used to prevent interferences between the cable and the electronic equipments. Thus, interference of electromagnetic leakage from electronic equipments is prevented, signal transmission is stabilized and wireless devices are prohibited from electronic radiation of cable for receiving excellent signals.

To sum up, the present invention is an anti-noise cable transferring 1 billion-plus bits per second, where connectors are used to connect different electronic equipments for data transference with coordination of metal cover layers and metal layers for preventing interferences between cable and electronic equipments; and, thus, interference of electromagnetic leakage from electronic equipments is prevented, signal transmission is stabilized and wireless devices are prohibited from electronic radiation of cable for receiving excellent signals.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An anti-noise cable transferring 1 billion-plus bits per second, comprising a cable wire, said cable wire comprising a plurality of signal lines, a plurality of power lines and a plurality of earth lines;

a first connector, said first connector being connected at an end of said cable wire, said first connector comprising a rubber core;

a plurality of pins, said pins being disposed on said rubber core, said pins being connected with said signal lines, said power lines and said earth lines;

a first metal shell, said first metal shell being covered on said rubber core;

a metal layer, said metal layer being layered on an inner surface of said first metal shell; and a plastic shell, said plastic shell being covered on said metal layer;

a second connector, said second connector being connected at another end of said cable wire, said second connector comprising a rubber core;

a plurality of pins, said pins being disposed on said rubber core, said pins being connected with said signal lines, said power lines and said earth lines;

a second metal shell, said second metal shell being covered on said rubber core;

a metal layer, said metal layer being layered on an inner surface of said second metal shell; and a plastic shell, said plastic shell being covered on said metal layer; and a metal cover layer, said metal cover layer being covered on said signal lines of said cable wire at two ends of said signal lines, said metal cover layer being connected with said first metal shell of said first connector and said second metal shell of said second connector, wherein said signal lines, said power lines and said earth lines of said cable wire are covered with a bonding braid at outside of said cable wire; and wherein said bonding braid is covered with a wire sheath at outside of said bonding braid.

2. The anti-noise cable according to claim 1, wherein said first connector comprises a plurality of universal serial buses (USB) piled up and said USB is selected from a group consisting of USB2.0 and USB3.0.

3. The anti-noise cable according to claim 1, wherein said second connector comprises a plurality of USBs arranged in parallel and said USB is selected from a group consisting of USB2.0 and USB3.0.

4. The anti-noise cable according to claim 1, wherein said metal layer is made of a material selected from a group consisting of gold, silver, copper, iron, a conducting metal and a composite conducting metal.

5. The anti-noise cable according to claim 1, wherein said metal cover layer is made of a material selected from a group consisting of gold, silver, copper, iron, a conducting metal and a composite conducting metal.

* * * * *